US006183540B1

(12) United States Patent
Thonsgaard

(10) Patent No.: US 6,183,540 B1
(45) Date of Patent: Feb. 6, 2001

(54) METHOD AND APPARATUS FOR REMOVING AROMATIC HYDROCARBONS FROM A GAS STREAM PRIOR TO AN AMINE-BASED GAS SWEETENING PROCESS

(75) Inventor: Jonathan E. Thonsgaard, El Campo, TX (US)

(73) Assignee: Kinder Morgan, Inc., Lakewood, CO (US)

(*) Notice: Under 35 U.S.C. 154(b), the term of this patent shall be extended for 0 days.

(21) Appl. No.: 09/384,465

(22) Filed: Aug. 27, 1999

(51) Int. Cl.[7] .................................................. B01D 53/14
(52) U.S. Cl. ............................. 95/166; 95/174; 95/184; 95/193; 95/199; 95/231; 95/236; 95/239; 96/271; 96/295
(58) Field of Search ........................... 95/165, 166, 173, 95/174, 177, 178, 179, 180, 183, 184, 187, 188, 190, 193, 194, 199, 206, 209, 231, 236, 237, 239; 96/234, 243, 271, 273, 277, 280, 295, 290, 322, 325, 326, 355

(56) References Cited

U.S. PATENT DOCUMENTS

| H825 | 10/1990 | Green et al. ............................ 62/20 |
|---|---|---|
| 3,120,993 | * 2/1964 | Thormann et al. ..................... 95/166 |
| 3,213,593 | 10/1965 | Hendrix . |
| 3,225,519 | * 12/1965 | Stotler ................................... 95/236 |
| 3,710,546 | * 1/1973 | Grunewald et al. ................... 95/174 |
| 3,736,725 | 6/1973 | Alleman et al. ......................... 55/32 |
| 3,767,766 | * 10/1973 | Tjoa et al. ............................. 95/173 |
| 3,918,934 | 11/1975 | Kriebel et al. .......................... 55/48 |
| 4,070,165 | * 1/1978 | Colton .................................... 95/236 |
| 4,097,250 | * 6/1978 | Pagani et al. .......................... 95/183 |
| 4,242,108 | * 12/1980 | Nicholas et al. ....................... 95/236 |
| 4,267,162 | 5/1981 | Maier .................................... 423/542 |
| 4,305,733 | 12/1981 | Scholz et al. ........................... 48/196 |
| 4,414,004 | 11/1983 | Wagner et al. ........................... 55/48 |
| 4,432,779 | * 2/1984 | Honerkamp et al. ................... 96/295 |
| 4,469,491 | 9/1984 | Finkel .................................... 55/29 |
| 4,479,811 | 10/1984 | Schlicht et al. ......................... 55/32 |
| 4,526,594 | 7/1985 | Mehra ..................................... 62/17 |
| 4,561,869 | * 12/1985 | Gazzi et al. ........................... 95/236 |
| 4,578,094 | * 3/1986 | Mehra .................................... 95/174 |
| 4,661,130 | * 4/1987 | Ebeling et al. ......................... 96/295 |
| 4,696,688 | 9/1987 | Mehra ..................................... 62/17 |
| 4,748,011 | 5/1988 | Baize .................................... 423/228 |
| 4,979,966 | 12/1990 | Rojey et al. ............................ 55/32 |
| 5,084,074 | 1/1992 | Beer et al. ............................... 55/20 |
| 5,085,675 | * 2/1992 | Kreibel et al. ......................... 95/163 |
| 5,141,536 | 8/1992 | Schievelbein et al. ................ 55/208 |
| 5,453,114 | 9/1995 | Ebeling ................................. 95/166 |
| 5,490,873 | 2/1996 | Behrens et al. ....................... 95/160 |
| 5,520,723 | 5/1996 | Jones, Jr. .............................. 95/161 |
| 5,536,303 | 7/1996 | Ebeling ................................. 95/166 |
| 5,643,421 | 7/1997 | Smith ................................... 203/12 |
| 5,766,313 | 6/1998 | Heath ................................... 95/161 |
| 5,782,958 | * 7/1998 | Rojey et al. ........................... 95/193 |
| 5,797,981 | 8/1998 | Collin et al. .......................... 95/174 |
| 5,820,837 | * 10/1998 | Marjanovich et al. ................ 95/173 |
| 6,001,153 | * 12/1999 | Lebas et al. .......................... 95/183 |
| 6,004,380 | * 12/1999 | Landreau et al. ..................... 95/174 |

* cited by examiner

Primary Examiner—Duane S. Smith
(74) Attorney, Agent, or Firm—Fields and Johnson, P.C.

(57) ABSTRACT

A method is provided for the extraction of aromatic hydrocarbons, including benzene, toluene, ethylbenzene, and xylene, collectively known as "BTEX," in a continuous process utilizing a glycol contactor to cause absorption of the BTEX upstream of an amine-based gas sweetening process. The preferred glycol for BTEX absorption is triethylene glycol. The glycol used in the glycol contactor for BTEX extraction may either be fully regenerated (dry), or wet glycol from a downstream gas dehydration system. The method may be achieved with the use of a number of separate absorber/contactor vessels, or the method may be achieved within one combination vessel.

20 Claims, 3 Drawing Sheets

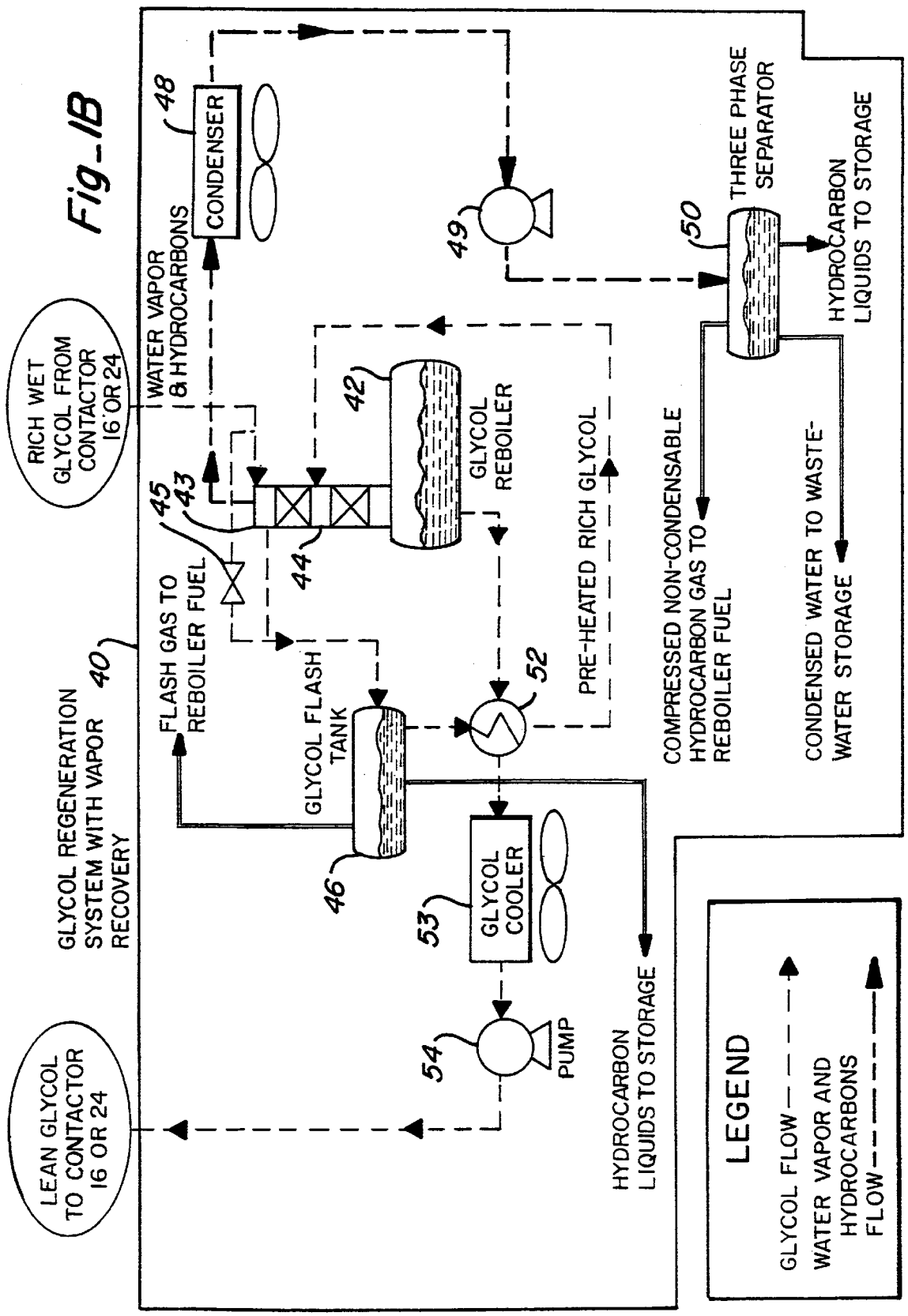

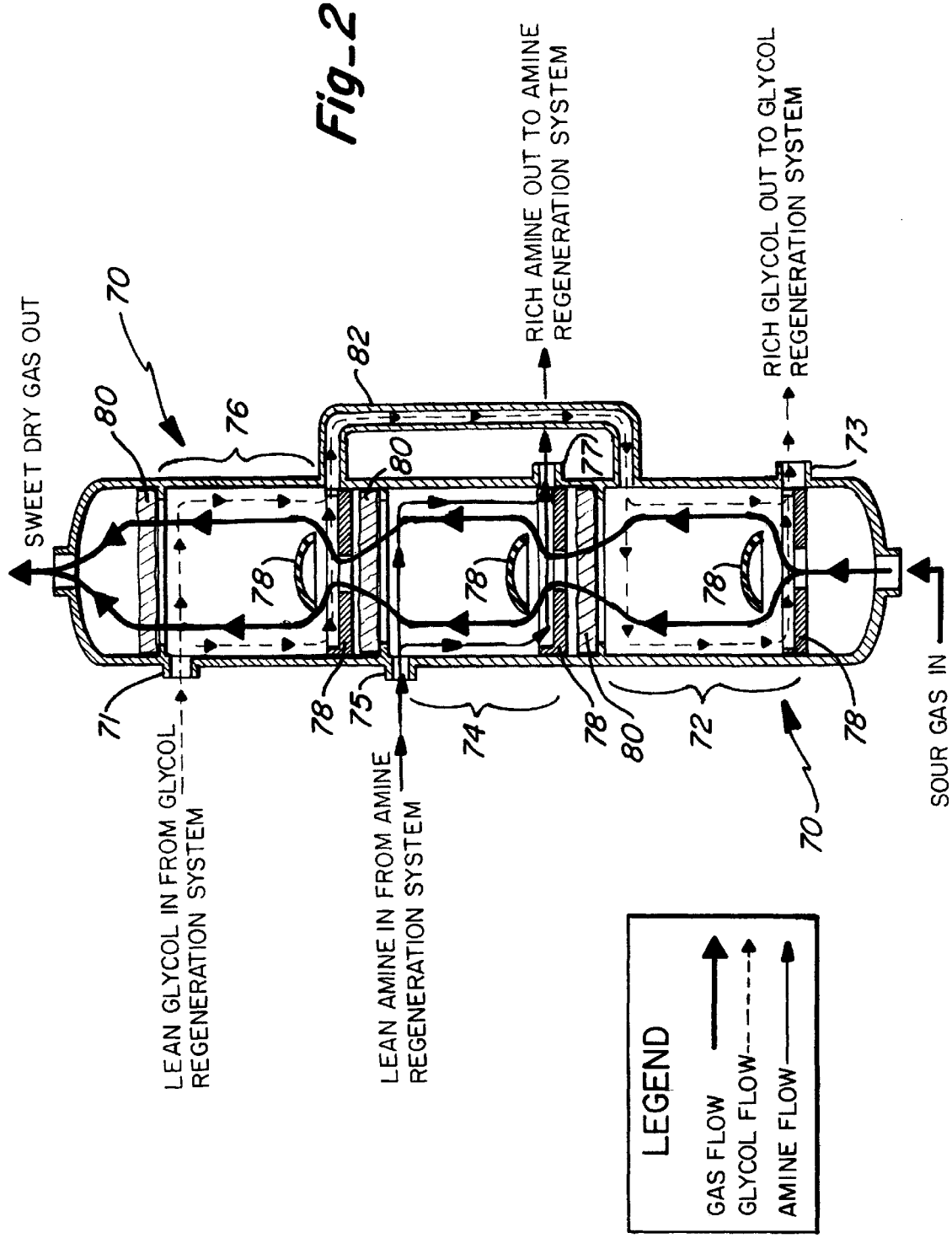

METHOD AND APPARATUS FOR REMOVING AROMATIC HYDROCARBONS FROM A GAS STREAM PRIOR TO AN AMINE-BASED GAS SWEETENING PROCESS

TECHNICAL FIELD

This invention relates to a method and apparatus for removing contaminants from a gas stream and, more particularly, to a method and apparatus for removing aromatic hydrocarbons from a natural gas stream prior to an amine-based gas sweetening process.

BACKGROUND ART

Natural gas often contains excessive quantities of carbon dioxide and/or hydrogen sulfide, collectively known as acid gases. These contaminants make the natural gas unsuitable for consumption. Aqueous amine-based processors are frequently used to remove these contaminants from the natural gas in a process referred to as "gas sweetening."

In the gas sweetening process, after the natural gas stream passes through the aqueous amine solution, chemical reactions take place wherein the natural gas becomes saturated with water. Accordingly, the water must then be removed. Water removal is accomplished using a dehydration system. The most common system used is a dehydration process utilizing triethylene glycol (TEG) as a liquid desiccant.

In addition to carbon dioxide and hydrogen sulfide contaminants, a natural gas stream often contains one or more aromatic hydrocarbons, including benzene, toluene, ethylbenzene, and xylene. These are collectively known as BTEX or BTX. When natural gas is processed in an amine-based gas sweetening process, significant amounts of BTEX are absorbed by the amine. In the gas sweetening process, the amine compounds are regenerated in a recycling process that results in release of the BTEX from the amine compounds. BTEX compounds are regulated pollutants that must be limited at each plant site below certain emission levels. In recent years, amine-based gas sweetening processes have been recognized as significant contributors to BTEX emissions. Several methods for control of BTEX emissions have been developed.

Control of BTEX emissions from an amine-based gas sweetening process is difficult to accomplish. Some processes attempt to remove BTEX from the amine stream prior to amine regeneration. Others attempt to treat the regeneration system exhaust gases to remove the BTEX emissions.

One currently accepted process for BTEX control is to incinerate the exhaust or tail gases from the amine regeneration system. The amine regeneration system essentially purifies the amine compounds by stripping the absorbed contaminants. Thus, the exhaust gases from the amine regeneration system contain not only the acid gases, but also BTEX that was absorbed by the amine in the amine contactor and then stripped by the regeneration process. This incineration of exhaust gases consumes very large amounts of fuel making it an expensive process, and actually increases other contaminants emitted such as carbon dioxide, which is a by-product of the combustion.

Other processes for BTEX emission control include the use of activated carbon filter systems to absorb the BTEX from the amine flow or from the tail gases in the amine regeneration system. The problem with these filter systems is that the saturated carbon filters still must be disposed of as they are saturated with BTEX contaminants. Furthermore, this process does not eliminate the BTEX from processing plant byproducts or emissions, unless the carbon is used as fuel or otherwise processed in yet another contaminant removal system.

In all of these processes, control of BTEX in an amine-base gas sweetening process is not achieved until after the BTEX has been absorbed in the amine stream. These processes used to remove the BTEX have extensive fuel requirements, have increased disposal and handling requirements, or divert part of the processing plants resources for the purpose of stripping BTEX from the rich amine.

One example of a prior art system for removing hydrocarbons from a natural gas stream is shown in U.S. Pat. No. 4,414,004 to Wagner, et al. The invention disclosed therein is a process for removing condensable aliphatic hydrocarbons and acidic gases from a natural gas stream where the stream is initially treated with polyethylene glycol as a solvent in a first absorption stage. The desired portion of the gas stream is drawn off from this first absorption stage and the stream is then treated with additional polyethylene glycol in a superatmospheric pressure environment in a second absorption stage, the acidic gases being completely or partly absorbed. The solvent which is saturated with the condensable aliphatic hydrocarbons obtained in the first absorption stage is then treated with water in an extraction stage to form a hydrocarbon phase containing the condensable aliphatic hydrocarbons and an aqueous ether phase, and then the hydrocarbon phase is separated from the aqueous ether phase. The solvent charged with acidic gases obtained from the second absorption stage is regenerated by expansion and/or stripping in a regeneration stage and the regenerated solvent is recycled to the absorption.

U.S. Pat. No. 5,453,114 to Ebeling discloses a method for drying natural gas and for reducing the emissions of hydrocarbon aromatics (BTEX) by ultimately separating such contaminants and disposing of them in a burner of a reboiler. The primary steps in this method include passing the natural gas stream through an absorber having a liquid desiccant, the desiccant absorbing water and hydrocarbon impurities from the gas and forming a spent desiccant, passing a portion of the treated gas from the absorber through a desiccant stripper vessel, the balance of the treated gas being passed for distribution, heating the spent desiccant and passing it through the desiccant stripper vessel to purge the spent desiccant of hydrocarbon aromatics, conducting the spent desiccant from the stripper vessel into a reboiler to again heat the spent desiccant, and finally conveying treated gas from the stripper vessel through a burner in a reboiler where the treated gas is combusted with air.

U.S. Pat. No. 5,490,873 to Behrens, et al. discloses a process for hydrocarbon emission reduction which includes the steps of contacting a natural gas stream in a contacting zone with glycol to produce a water rich glycol stream and a dried gaseous product. The rich glycol is heated in a glycol regeneration zone to a temperature below glycol decomposition temperature to produce (i) a water lean glycol for use in contacting additional natural gas in the contacting zone, and (ii) a gaseous, water containing mixture also containing hydrocarbons. Partial condensation of this gaseous mixture provides liquid hydrocarbon, aqueous waste and a gaseous portion that is reintroduced into the contacting zone for contacting, along with additional natural gas feed, with glycol. Ultimately, the hydrocarbon liquids are sent to storage for sale or further separation.

U.S. Pat. No. 5,766,313 to Heath discloses a hydrocarbon recovery system for treating emissions from a glycol reboiler. In short, the emissions from the reboiler are condensed, pressurized and separated so that the hydrocarbon contaminants vapors (such as BTEX) may be directed to a burner used to supply heat to a reboiler.

U.S. Pat. No. 5,084,074 to Beer, et al. discloses a method and apparatus for separating and recovering water and light aromatic hydrocarbons from a gaseous stream. As with the patent mentioned directly above, the recovered hydrocarbons are used to fire a regenerator used in the regeneration of glycol. More specifically, the natural gas stream is contacted with an absorbent (such as glycol) to absorb the water and light aromatic hydrocarbons (BTEX) to produce a water and light hydrocarbon laden stream and a dry gaseous stream. The water and light aromatic hydrocarbon stream is heated in a regenerator to produce a vaporous water and a light aromatic hydrocarbon stream and a lean absorbent for recycle to the contactor. The vaporous water and light aromatic hydrocarbon stream is condensed so that the liquefied light aromatic hydrocarbons are recovered and a separate light gas stream is also recovered for use as fuel gas for the regenerator.

While the foregoing prior art references may be adequate for their intended purposes, none of them disclose the method of this invention, which is explained below in detail.

SUMMARY OF THE INVENTION

The method of this invention is a continuous process for the extraction of aromatic hydrocarbons from a gas stream using glycol to reduce the absorption of the aromatic hydrocarbons in a subsequent amine absorber used in a gas sweetening process. The glycol may be ethylene glycol, diethylene glycol, triethylene glycol (TEG), tetraethylene glycol or any mixture of these glycols. TEG is the preferred glycol for absorption of the aromatic hydrocarbons, since it has the highest solubility for the aromatic hydrocarbons that are part of the BTEX group. The glycol may either be fully regenerated (dry) or water saturated before contacting the natural gas stream containing the aromatic hydrocarbons. TEG is known to have a very high affinity for aromatic compounds, especially BTEX. TEG is heavily used in the gas industry to remove water vapor from gas streams. It is also known that TEG absorbs significant quantities of BTEX from the gas stream during the drying process. Relative to a constant natural gas rate, the absorption rate of BTEX in glycol increases as the glycol circulation rate is increased and/or the contact time between the gas stream and the glycol is increased.

In addition to using TEG as a compound to dehydrate a gas stream or to absorb BTEX in a gas stream, TEG is also used in the refining industry to remove BTEX compounds from various liquid products, either for concentrating the BTEX for use in other products or for simply refining the liquid products. These other uses of TEG, however, are found in liquid/liquid extraction processes that are quite different from a natural gas sweetening process.

A typical amine-based gas treatment system for gas sweetening includes a contactor for exposing the natural gas stream to amine-based compounds, followed by a gas dehydration system. Typically, a TEG gas dehydration system is used since it is the most efficient larger-scale gas dehydration system available. In addition to the amine contactor and gas dehydration system, a process must also be provided for regeneration of the saturated glycol, and for regeneration of the saturated amine compounds.

The method of this invention utilizes a spent process stream (rich or wet glycol) to perform the duty of BTEX absorption upstream of the amine absorber. Lean or dry glycol, of course, may be used in the BTEX absorption upstream of the amine absorber, if this excess capacity is either available or required. The rich or wet glycol is recovered from the gas dehydration system. The vessel used for the upstream BTEX absorption can be a contactor of the same type as the amine contactor or the downstream glycol contactor for dehydration. By using the wet glycol for BTEX absorption, no additional fuel costs are involved in the overall gas sweetening process. Transfer of the rich or wet glycol from the gas dehydration system may be achieved by a booster pump, or depending upon the arrangement of the plant, gravity flow could be used to transfer the wet glycol. The solubility of BTEX in glycol is not significantly changed after it has been used in a dehydration system, since the glycol concentration is only slightly reduced by the absorption of water. This means that the rich or wet glycol has about the same capacity to absorb BTEX as lean or dry glycol. This further enhances the desirability of using rich glycol from the dehydration system, since a separate complete glycol regeneration system is not required for BTEX absorption. Only an additional contactor and pump(s) are required, if the rich glycol is used for BTEX absorption. Furthermore, the stripping of the rich glycol in the glycol regeneration system is not adversely affected by the presence of BTEX. In fact, the stripping of glycol is enhanced by the presence of aromatic compounds, such as benzene, which act as an azeotroping agent, reducing the energy requirements for glycol regeneration.

The major structural components that may be used to achieve the method of this invention include a first upstream glycol contactor for extracting BTEX from the natural gas stream passing there through. As discussed above, the particular glycol used may ethylene, diethylene, TEG, tetraethylene glycol or any mixture of these glycols. The natural gas stream then passes through an amine contactor for gas sweetening. The next major component of the system is a second downstream glycol contactor for dehydration. The rich or wet glycol exiting the second downstream glycol contactor may be used as the circulating glycol in the first upstream glycol contactor. A pump may be used to transfer this rich glycol. The term "upstream" and "downstream" used throughout refer to the flow of gas, and not to the flow or travel of glycol or amine.

The specific construction of the first glycol contactor may be any conventional contactor that utilizes trays, packing or any other method of causing intimate contact between the liquid glycol, which flows down through the absorber or contactor, and the upward flowing gas. To maximize BTEX absorption in the circulating glycol, the particular BTEX absorption rate of the glycol used would determine the optimum glycol circulation rates and specific absorber design. For example, a low BTEX absorption rate in the glycol used would require either higher glycol circulation rates through the contactor or increased contact time between the glycol and gas stream.

A conventional glycol regeneration system may be used to remove the absorbed BTEX from the glycol stream. In the preferred embodiment, a single glycol regeneration system may be used which receives rich glycol from the first glycol contactor, and returns regenerated glycol to the second downstream contactor used for dehydration. Alternatively, an additional glycol regeneration system can be used to service the regeneration of glycol from the first upstream glycol contactor while the original glycol regeneration system can service the second downstream contactor.

The first upstream glycol contactor for BTEX extraction could be contained within the same vessel as the amine absorber for gas sweetening, using existing absorber design techniques. Alternatively, the first upstream glycol contactor for BTEX extraction, the amine contactor for gas sweetening, and the second downstream glycol contactor for dehydration could be contained within the same vessel, since only liquid separation is required between each of the absorption processes. Whether a separate first upstream glycol contactor is used, or whether this first upstream glycol contactor is used in the same vessel as the other contactors, emphasis is placed on maximization of contact time of the glycol with the natural gas stream to maximize the BTEX absorption prior to entering the amine contactor.

The same glycol stream can be used both in the upstream glycol contactor or in the second downstream glycol contactor, since the BTEX absorption upstream will not adversely affect the dehydration capability of the glycol stream in the second downstream glycol contactor. As discussed above, the rich glycol with the extracted BTEX from the upstream glycol contactor would be transferred to the glycol regeneration system.

The apparatus of this invention can be a single vessel that incorporates the major steps in the method, or the apparatus can be a pair of vessels, as further described below.

Calculations have shown that for the method of this invention, approximately one-third of the BTEX can be extracted from the natural gas stream by use of the first upstream glycol contactor. Thus, potential emissions from the subsequent amine system would be reduced by a proportional amount, since the BTEX absorption in amine is directly related to the BTEX concentration in the gas stream. This reduction of BTEX can be accomplished without any downstream modifications to the gas sweetening process. These calculations were based upon use of a contactor that is of the same construction as a standard contactor used for gas sweetening or dehydration. Modifications can be made to this standard contactor to increase contact time between the glycol and the natural gas stream that, in turn, would further improve the degree of BTEX extraction.

The BTEX that has been absorbed from the natural gas stream by the glycol is removed in a currently available glycol regeneration system, as further discussed below.

The advantages of the invention described herein will be further apparent by the following description taken in conjunction with the accompanying drawings.

BRIEF DESCRIPTION OF THE DRAWINGS

FIGS. 1A and 1B are schematic diagrams illustrating the method of this invention; and FIG. 2 is a schematic diagram of a single vessel which contains an upstream glycol contactor section for BTEX extraction, an amine contactor section for gas sweetening, and a second downstream glycol contactor section for dehydration.

BEST MODE FOR CARRYING OUT THE INVENTION

Figure 1A:
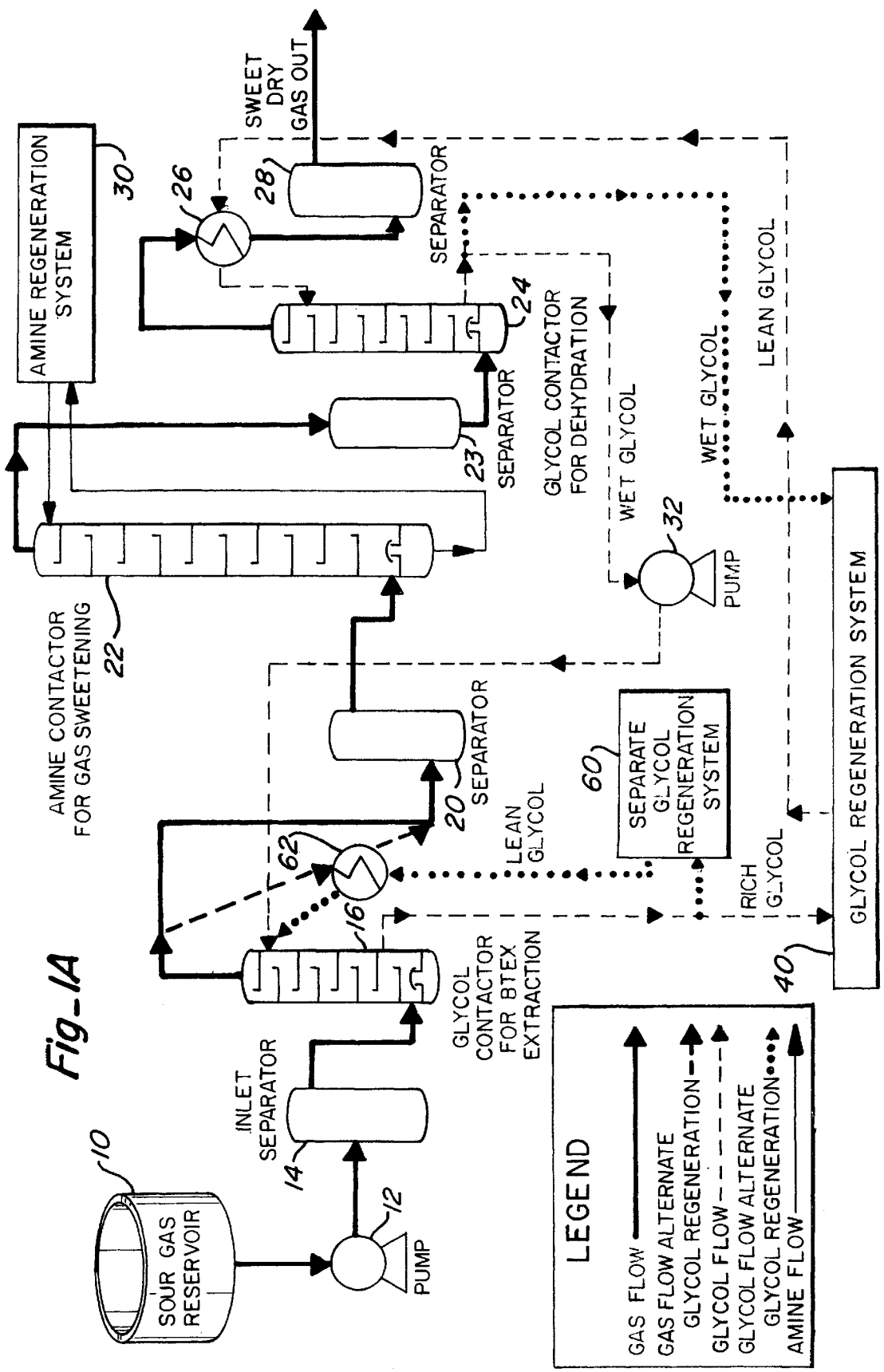

FIGS. 1A and 1B are schematic diagrams illustrating the method of this invention. As used in these Figures, the heavier solid transfer lines indicate gas flow, the heavier dashed transfer lines indicate gas flow in an alternative method for glycol regeneration, the lighter dashed transfer lines indicate glycol flow, the dotted transfer lines indicate glycol flow in the alternative method for glycol regeneration, the lighter solid transfer lines indicate amine flow, and the combination dashed transfer lines and solid transfer lines indicate water vapor and hydrocarbon flow. A sour gas reservoir 10 or some other source of a sour gas stream is supplied by pump 12 through an inlet separator 14 for separating free liquids from the production field, such as salt water. The natural gas stream is then transferred to the first glycol contactor 16 that absorbs BTEX from the natural gas stream. After the gas stream passes through the first glycol contactor 16, it is then passed through separator 20. The glycol that passes through contactor 16 is then transferred directly to glycol regeneration system 40. Separator 20 captures any glycol that is carried out of contactor 16. Glycol that is collected in separator 20 can be disposed of, or the captured glycol also could be returned to glycol regeneration system 40. Next, the gas stream is transferred to amine contactor 22 for gas sweetening to remove acid gases such as hydrogen sulfide and carbon dioxide. The bulk of the saturated amine stream returns to amine regeneration system 30. However, some amine compounds and water, along with other contaminants will remain in the natural gas stream. Accordingly, separator 23 is provided to further remove remaining amine compounds and other contaminants. The gas stream then is transferred to the second downstream glycol contactor 24. Since the amine used for sweetening in contactor 22 is actually a solution diluted with water, the gas that leaves amine contactor 22 will be saturated with water vapor. The gas stream next is transferred to the second glycol contactor 24. Dehydration is achieved in this second contactor 24 by contacting the gas stream a second time with glycol. The gas stream is then transferred to another heat exchanger 26 and an outlet separator 28. Since the glycol that exits the glycol regeneration system 40 is hot, heat exchanger 26 provides the final stage of lean glycol cooling before the glycol is introduced into the second glycol contactor 24. The gas stream passing through heat exchanger 26 acts as the cooling source for the glycol. The bulk of the glycol used in the second glycol contactor 24 passes through the contactor 24 and is pumped upstream by pump 32 for introduction into the first glycol contactor 16. However, as with the first glycol contactor 16, some of the glycol will remain suspended in the gas stream exiting contactor 24. Accordingly, outlet separator 28 is used for removal of the suspended glycol. After passing through separator 28, the natural gas stream is ready for consumption as a sweet, dry gas. The amine regeneration system 30 is used to provide regenerated amine back to the amine contactor 22. FIG. 1A shows that wet glycol exiting the glycol contactor 24 may be transferred to the first glycol contactor 16 as by pump 32. Alternatively, gravity flow could be used depending upon the specific arrangement of the plant.

FIGS. 1A and 1B further illustrate a glycol regeneration system with vapor recovery capability. As shown, rich or wet glycol enters glycol regeneration system 40 from first glycol contactor 16. The gas stream traveling through contactor 16 cools the glycol that exits contactor 16. Part of the cooled glycol stream is routed first through the reflux condenser 43 in the top of column 44 and then to the glycol flash tank 46. The remaining part of the cooled glycol stream is transferred directly to the glycol flash tank 46 through bypass valve 45. Most of the hydrocarbons and other volatile compounds that are entrained in the rich, wet glycol are flashed off in the glycol flash tank 46. The flash gas that exits glycol flash tank 46 is either burned as fuel in glycol reboiler 42 or routed to other processes. Liquid hydrocarbons that are separated in the glycol flash tank are sent to a hydrocarbon storage tank (not shown). From glycol flash tank 46, the rich glycol passes through heat exchanger 52 where it is heated by hot lean glycol from glycol reboiler 42. From heat exchanger 52, the rich glycol enters column 44 where liquid glycol falls down into glycol reboiler 42 and water vapor and hydrocarbon vapors, including BTEX vapors, flow upward to exit the column as an exhaust gas stream. At least some portion of the glycol remains in a vaporized state in the middle of column 44. The circulation of cool rich glycol through the reflux condenser 43 is regulated so that temperatures in the top of column 44 will cause the glycol to condense as a liquid and fall out of the vapor stream that is exiting column 44, without condensing the water and hydrocarbon vapors. The exhaust gas stream is then transferred to condenser 48 to condense the water, BTEX and other hydrocarbons out of the exhaust gases. At least some portion of the BTEX and hydrocarbons will not condense in condenser 48, leaving some of the BTEX and hydrocarbons in a vapor state. A compressor 49 is used to compress the vapors and liquids from condenser 48 into three-phase separator 50, allowing the water, BTEX and other hydrocarbons to be collected and separated within the three phase separator 50. The three-phase separator 50 will separate the water, liquid hydrocarbons and non-condensed hydrocarbon vapors into three separate streams. The water from three-phase separator 50 is sent to wastewater storage (not shown). The condensed hydrocarbon liquids, including the condensed BTEX, are sent to hydrocarbon liquid storage (not shown). The remaining compressed hydrocarbon vapors are used as fuel for glycol reboiler 46 or they may be used in other processes. In either case, all of the BTEX and hydrocarbons that are collected by the glycol stream are either burned as fuel or routed to other process, thus eliminating them as an emission source to the atmosphere. The dry (lean) glycol from glycol reboiler 42 is then transferred by pump 54 for reintroduction back to the second glycol contactor 24. As also shown, the same heat exchanger 52 used to heat the wet glycol from flash tank 46 is also used to cool the dry glycol returning to the second glycol contactor 24. A glycol cooler 53, which exhausts excess heat to the atmosphere, is normally required in addition to heat exchangers 52 and 26, before pump 54 to further cool the lean glycol to the desired temperatures before it is introduced to contactor 24. Several commercial glycol regeneration systems are available that can condense, or otherwise process the BTEX and hydrocarbon vapors, preventing the BTEX from being exhausted into the atmosphere as a volatile emission. Many existing gas-sweetening plants have vapor recovery units in place as part of the dehydration system of the plant. These same vapor recovery units are also appropriate for use in the glycol regeneration system 40.

FIGS. 1A and 1B also show an alternate method of providing regenerated glycol to both the first glycol contactor 16 and the second glycol contactor 24. In this alternate arrangement, the first glycol contactor 16 could have its own dedicated glycol regeneration system 60. This system 60 could be identical in construction to the glycol regeneration system 40 described above. As shown by dotted transfer lines in FIG. 1A, the wet glycol exiting the glycol contactor 16 could be transferred directly to the dedicated glycol regeneration system 60, and the dry or lean glycol then be returned directly to the glycol contactor 16. As also shown, a heat exchanger 62 can be used to provide the final necessary cooling to the hot regenerated glycol. The heat exchanger 62 is not required if only glycol regeneration system 40 is used because the wet glycol exiting the second glycol contactor 24 is already cooled. The cooling of the glycol through heat exchanger 62 is achieved by use of the cooler gas stream as the cooling element through heat exchanger 62. The heavier dashed transfer lines illustrate the gas stream flow through heat exchanger 62. The existing glycol regeneration system 40 could be used solely for regeneration of glycol used in the second glycol contactor 24. Thus, the dotted transfer lines also indicate that the rich glycol exiting the second glycol contactor 24 can be introduced directly into glycol regeneration system 40, and the dry or lean glycol then returned directly to the second glycol contactor 24.

Although FIGS. 1A and 1B disclose a specific gas sweetening process enhanced by the first glycol contactor 16, it shall be understood that the first glycol contactor 16 can be used in any amine based gas sweetening process which includes an amine contactor for gas sweetening, and a glycol contactor for dehydration. Accordingly, the various heat exchangers, separators, and regeneration systems are merely illustrated to show an example of how a generic gas sweetening process occurs.

FIG. 2 is a schematic diagram of a single vessel which contains a first upstream glycol contactor section for BTEX extraction, an amine contactor section for gas sweetening, and a second downstream glycol contactor section for dehydration. The method of this invention incorporating the use of a single vessel would be advantageous for treating smaller volumes of gas, and for treatment of a gas stream where there is limited floor space. For example, an offshore platform has limited floor space available and incorporating the use of a single vessel for treating the gas stream is highly advantageous. Weight limitations, such as in an offshore platform, also makes the use of a single vessel more advantageous. Furthermore, it is unnecessary to use an intermediate pump to move the glycol from the downstream glycol contactor to the upstream glycol contactor since gravity flow is used.

The structure of the single vessel can be a combination absorber/contactor vessel 70 which includes three major sections for gas treatment, namely, an upstream glycol contactor section 72 for BTEX extraction, an amine contactor section 74 for removal of acid gases which is downstream of the glycol contactor 72, and a downstream glycol contactor section 76 for dehydration, which is downstream of the amine contactor 74. As with FIGS. 1A and 1B, the heavier, solid transfer lines indicate gas flow, the dashed transfer lines indicate glycol flow, and the lighter solid lines indicate amine flow. Contactor sections 72, 74 and 76 may be constructed of typical countercurrent mixing equipment, such as trays or packing, designed to cause countercurrent streams to mix effectively. Lean glycol from a regeneration system (such as regeneration system 40 of FIG. 1B) enters the upper end of the combination vessel 70. Sour gas under pressure enters the lower end of the combination vessel 70. The force of gravity causes the glycol to pass through the combination vessel 70 in a downward direction and the gas under pressure passes through the combination vessel 70 in an upward direction.

Beginning first with an explanation of the glycol flow and gas flow at the lower end of the combination vessel 70, the sour gas passes through the first contactor section 72 in a countercurrent relationship with the downward flowing glycol. BTEX extraction is achieved in this section and the rich glycol flows away from the combination vessel 70 at outlet 73. The rich glycol is then transferred to the glycol regeneration system. In order to trap the rich glycol for removal from the combination vessel 70, and to allow the sour gas to continue to travel upward through the vessel, a device known in the art as a "hat tray" 78 is used. Essentially, a hat tray allows the gas to travel upward and simultaneously traps the rich glycol fluid in a tray that communicates with outlet 73. The gas continues to travel upward through the combination vessel 70 through a mist extractor 80. The mist extractors are used between contactor sections to filter or separate out any glycol or amine that has become entrained in the gas flow through each contactor section. The gas stream continues with its travel to and through amine contactor section 74 wherein the gas stream comes in countercurrent contact with amine supplied through amine inlet 75. The amine exits the section 74 through amine outlet 77 wherein the rich amine is transferred to an amine regeneration system (such as amine regeneration system 30 of FIG. 1A). In order to trap the rich amine, a second hat tray 78 may be used within amine contactor section 74. The gas stream continues its upward travel through the combination vessel 70 by passing through another mist extractor 80 (for amine filtering) and into the downstream glycol contactor section 76. Within this section, the gas stream comes into countercurrent contact with the lean glycol supplied from the regeneration system at inlet 71. The water introduced from the amine contactor section 74 is removed in section 76. A third hat tray assembly 78 is used in section 76 to collect wet glycol. This wet glycol is transferred by glycol bypass line 82 into the glycol contactor section 72 that achieves the upstream BTEX extraction. Because of the downward flow of the wet glycol in bypass line 82, there is no need for a separate pump. Finally, the gas stream passes through yet another mist extractor 80 (for filtering suspended glycol liquid) and sweet, dry gas is the resultant product that exits the vessel 70.

Thus, FIG. 2 illustrates a single vessel that can be used to achieve the method of this invention. If the amount of sweet, dry gas must be increased, a plurality of vessels 70 may be used for treating a sour gas stream. Depending upon available floor space, weight restrictions, and other factors, a plurality of vessels 70 may be more advantageous than utilizing the layout shown in FIGS. 1A and 1B. Although FIG. 2 illustrates a vessel having three separate sections, the scope of this invention also contemplates the use of two vessels for achieving the method of this invention. More specifically, the upstream glycol contactor could be found in one vessel and the amine contactor and the downstream glycol contactor could be found together in a second vessel. In such a case, the upstream glycol contactor could be placed at an elevation lower than the downstream glycol contactor so that the glycol flowing from the downstream glycol contactor back to the upstream glycol contactor would operate by gravity and would not require an intermediate pump for transfer. Alternatively, this two-vessel arrangement could be configured for having the upstream glycol contactor and the amine contactor in one vessel, and having the downstream glycol contactor in another vessel. In either case, a single pipe or connecting line would be used for connecting the flow of gas between the two vessels.

This invention has been described with respect to particular embodiments thereof, but it will be understood that other changes or modifications may be made to these preferred embodiments, and which do not depart from the intended scope of the claims herein.

What is claimed is:

1. A method for removing aromatic hydrocarbons from a gas stream treated in an amine-based gas sweetening process to prevent the same aromatic hydrocarbons from entering the amine process and becoming a potential emission source, said method comprising the steps of:
   providing a flow of gas containing aromatic hydrocarbons to include BTEX;
   initially treating the flow of gas by passage through a first glycol contactor for absorbing the BTEX; and
   then treating the flow of gas by passage through an amine-based gas sweetening process including an amine contactor for gas sweetening to remove acidic gases, and a second glycol contactor for dehydration and further absorption of BTEX.

2. A method, as claimed in claim 1, further including the step of:
   recirculating wet glycol produced by the second glycol contactor through the first glycol contactor.

3. A method, as claimed in claim 2, wherein:
   said recirculating step is achieved by pumping the wet glycol from a glycol stream outlet on the second glycol contactor to a glycol stream inlet on the first glycol contactor.

4. A method, as claimed in claim 2, wherein:
   said recirculating step is achieved by gravity flow between a glycol stream outlet on the second glycol contactor, and a glycol stream inlet on the first glycol contactor.

5. A method, as claimed in claim 1, further including the step of:
   regenerating the glycol used in the first and second glycol contactors by a regeneration system interconnecting a glycol stream outlet on the first glycol contactor and a glycol stream inlet on the second glycol contactor.

6. A method, as claimed in claim 1, further including the step of:
   regenerating the glycol used in the second glycol contactor by a first regeneration system interconnecting a glycol stream outlet on the second glycol contactor with a glycol stream inlet on the second glycol contactor; and
   regenerating the glycol used in the first glycol contactor by a second regeneration system interconnecting a glycol stream outlet on the first glycol contactor with a glycol stream inlet on the first glycol contactor.

7. A method, as claimed in claim 1, wherein:
   said first glycol contactor and said amine contactor are arranged in a single vessel for first contacting the flow of gas with glycol for the BTEX absorption, and then contacting the flow of gas with amines for removal of the acid gases.

8. A method, as claimed in claim 1, wherein:
   said first glycol contactor and said amine contactor are arranged in separate, respective vessels.

9. A method, as claimed in claim 1, wherein:
   said second glycol contactor and said amine contactor are arranged in a single vessel for contacting the flow of gas with amines for removal of the acidic gases, and then contacting the flow of gas with glycol for the dehydration and the further absorption of BTEX.

10. A method, as claimed in claim 1, wherein:
    said first glycol contactor, said amine contactor, and said second glycol contactor are arranged in a single vessel for first contacting the flow of gas with glycol for the BTEX absorption, then contacting the flow of gas with amines for removal of the acid gases, and then contacting the flow of gas with glycol for the dehydration and the further absorption of BTEX.

11. A method, as claimed in claim 10, further including the step of recirculating wet glycol produced by the second glycol contactor through the first glycol contactor.

12. A method, as claimed in claim 1, further including the step of:
    recirculating amine used in the amine contactor by an amine regeneration system connected to the amine contactor.

13. An apparatus for gas sweetening and removing aromatic hydrocarbons from a gas stream passing through said apparatus from an upstream location to a downstream location, said apparatus comprising:

a vessel having an upper end and a lower end;

an upstream glycol contactor section for BTEX absorption placed within said vessel and positioned adjacent said lower end;

a downstream glycol contactor section for dehydration and further BTEX absorption placed within said vessel and positioned adjacent said upper end;

an amine contactor section for gas sweetening placed within said vessel and positioned between said upstream glycol contactor and said downstream glycol contactor;

a glycol bypass line interconnecting said upstream and said downstream glycol contactor sections; and wherein the gas stream makes countercurrent contact with glycol flowing through said upstream and said downstream glycol contactor sections, and with amine flowing through said amine contactor, said glycol bypass line allowing glycol to flow from said downstream glycol contactor section to said upstream glycol contactor section.

14. An apparatus, as claimed in claim 13, wherein:

said upstream and said downstream glycol contactor sections each contain respective hat tray assemblies therein for capturing and separating glycol from the gas stream.

15. An apparatus, as claimed in claim 13, wherein:

said amine contactor section includes a hat tray assembly therein for capturing and separating amine from the gas stream.

16. An apparatus, as claimed in claim 13, further including:

at least one mist extractor positioned within said vessel and placed in contact with the gas flow for filtering glycol or amine from the flow of gas.

17. An apparatus for gas sweetening and removing aromatic hydrocarbons from a gas stream passing through said apparatus from an upstream location to a downstream location, said apparatus comprising:

a vessel for use in treatment of the gas stream containing aromatic hydrocarbons to include BTEX, the gas stream flowing through said vessel from an upstream location to a downstream location;

an amine contactor in said vessel for gas sweetening to remove acid gases from the gas stream flowing through said amine contactor; and a first glycol contactor in said vessel at an upstream location from said amine contactor for absorbing BTEX from the gas stream.

18. An apparatus, as claimed in claim 17, further including:

a second glycol contactor in said vessel at a downstream location from said amine contactor for dehydration and further absorption of BTEX from the gas stream.

19. An apparatus, as claimed in claim 18, further including:

a glycol line interconnecting said first and second glycol contactors to recirculate glycol from said second glycol contactor to said first glycol contactor.

20. An apparatus, as claimed in claim 18, wherein:

the glycol flows in a closed loop through said first and second glycol contactors and said apparatus further includes a glycol regeneration system interconnecting said first glycol contactor to said second glycol contactor for regenerating rich glycol exiting said first glycol contactor and reintroducing lean glycol into said second glycol contactor.

* * * * *